United States Patent [19]

Sherwood et al.

[11] 4,153,234

[45] May 8, 1979

[54] WALL SUPPORTED HANDRAIL ASSEMBLY

[75] Inventors: Edward F. Sherwood, Gettysburg, Pa.; Larry M. Markle, Harney, Md.

[73] Assignee: Westinghouse Electric Corp., Pittsburgh, Pa.

[21] Appl. No.: 924,421

[22] Filed: Jul. 13, 1978

[51] Int. Cl.² ............................................. E04H 17/14
[52] U.S. Cl. ...................................... 256/69; 248/251; 403/245; 403/353
[58] Field of Search ...................... 256/65, 67, 68, 69; 248/225.3, 251, 348, 349; 182/220, 228; 403/230, 245, 348, 349, 353

[56] References Cited

U.S. PATENT DOCUMENTS

| 7,035 | 1/1850 | Elder | 403/230 X |
|---|---|---|---|
| 474,813 | 5/1892 | Clements | 256/65 |
| 3,009,719 | 11/1961 | Otto et al. | 403/348 X |
| 3,749,432 | 7/1973 | Janssen | 403/353 X |

FOREIGN PATENT DOCUMENTS 1220240  5/1960  France ..................................... 403/230

*Primary Examiner*—Werner H. Schroeder
*Assistant Examiner*—C. J. Arbes
*Attorney, Agent, or Firm*—D. R. Lackey

[57] ABSTRACT

A handrail assembly adapted for mounting between two spaced parallel surfaces. The handrail member and its mounting brackets are cooperatively configured to enable the handrail member to be supported by the brackets while concealing the brackets and the means which locks the handrail member and its mounting brackets in assembled relation.

10 Claims, 9 Drawing Figures

WALL SUPPORTED HANDRAIL ASSEMBLY

BACKGROUND OF THE INVENTION

1. Field of the Invention

The invention relates in general to handrail assemblies, and more specifically, to handrail assemblies adapted for mounting between first and second vertically oriented, spaced surfaces, to provide a handrail function for a third surface which extends between the first and second surfaces.

2. Description of the Prior Art

In certain applications, a wall supported handrail structure is required adjacent to a surface, such as a wall, to function as a hand support and/or as a protective device for the associated wall. In certain of these applications, the wall surface which is to have a handrail function associated therewith is not suitable for supporting the handrail, and the handrail must extend without intermediate support between two spaced parallel wall surfaces which are perpendicular to the wall to be associated with the handrail. For example, an elevator car for installation on the outside wall of a building may have a rear wall formed of glass. Thus, the handrail for this glass wall is preferably attached to the side walls, which will be made of metal, such as steel, or a non-metallic material, such as wood. When a handrail is mounted on the wall it is to be associated with, its mounting brackets are easily concealed behind the handrail itself, discouraging vandalism as well as making the handrail assembly more pleasing aesthetically.

It would thus be desirable to provide a new and improved handrail assembly adapted for mounting between two spaced parallel, vertically oriented surfaces, which may be easily and quickly installed, with the resulting assembly concealing the mounting brackets to discourage vandalism and to enhance the beauty of the handrail.

SUMMARY OF THE INVENTION

Briefly, the present invention is a new and improved handrail assembly which includes a handrail member and first and second mounting brackets. The first and second mounting brackets are mounted on the facing surfaces of first and second spaced parallel walls, adjacent to the surface of a third wall which extends between the first and second walls. The handrail member has cavities which extend inwardly from both of its ends, with a slot or notch being formed in the handrail member, at each end. The slots are formed and configured to allow access to the cavities from a direction perpendicular to the longitudinal axis of the handrail member. A fastener device, such as an Allen head setscrew, is disposed on the handrail member, at each end, through threaded openings which communicate with the cavities.

To assemble the handrail member with the mounting brackets, the handrail member is oriented with the slots directly over the first and second mounting brackets. The handrail is then lowered such that the mounting brackets enter the cavities via the slots. The handrail member is then rotated about its longitudinal axis to rotate the slots into the lower rear quadrant, where they are concealed between the handrail member and the third wall. This rotation also moves the setscrews to the bottom of the handrail member and orients them with depressions formed in the mounting brackets for receiving the setscrews. Advancing the setscrews into the depressions locks the handrail member in the proper assembled relation with its mounting brackets, resulting in a handrail assembly in which the mounting brackets are completely concealed within the cavities, and with the associated slots and setscrews concealed from any normal viewing angle.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
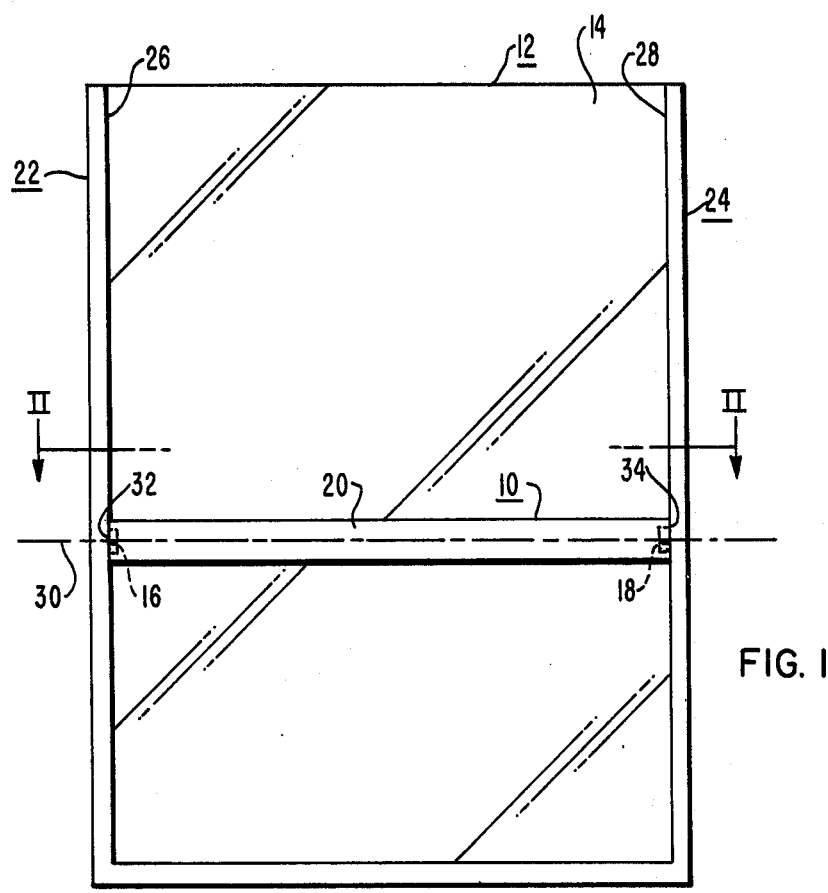
FIG. 1 is an elevational view of a handrail assembly mounted on brackets fixed to the surfaces of two spaced parallel walls.
Figure 2:
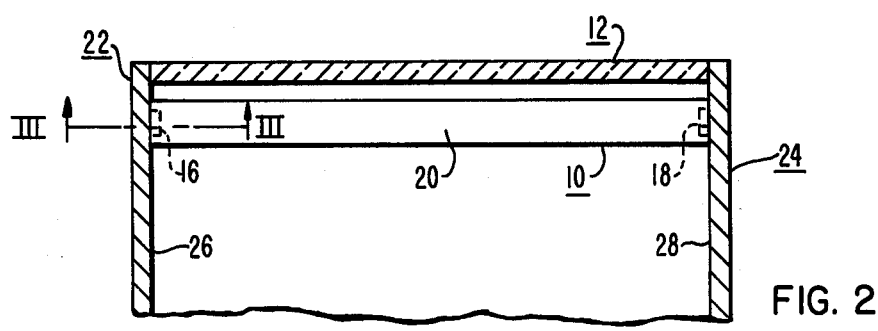
FIG. 2 is a plan view of the handrail assembly shown in FIG. 1, taken between and in the direction of arrows II—II.

Referring now to the drawings, and to FIGS. 1 and 2 in particular, there is shown a handrail assembly 10 which is constructed according to the teachings of the invention. Handrail assembly 10 provides handrail and protective functions for a wall 12 having a surface 14 which faces the handrail assembly 10. The wall 12 may be constucted of a material which is not suitable for direct mounting of the handrail assembly thereon, e.g., as illustrated, wall 10 may be formed of a transparent material such as glass. Thus, the handrail assembly 10 which includes first and second mounting bracket members 16 and 18, respectively, and a handrail member 20, is attached to first and second side wall members 22 and 24, respectively, which have vertically oriented, spaced parallel surfaces 26 and 28, respectively. Wall 12 joins walls 22 and 24, with walls 12, 22 and 24 forming the walls of a structure such as an elevator cab, for example. Handrail member 20 is an elongated member having a longitudinal axis 30, first and second ends 32 and 34, respectively, and a predetermined length dimension selected such that the handrail member will extend perpendicularly between surfaces 26 and 28 with predetermined small clearances, such as 0.060 inch, between each end and the adjacent wall surface.

Figure 3:
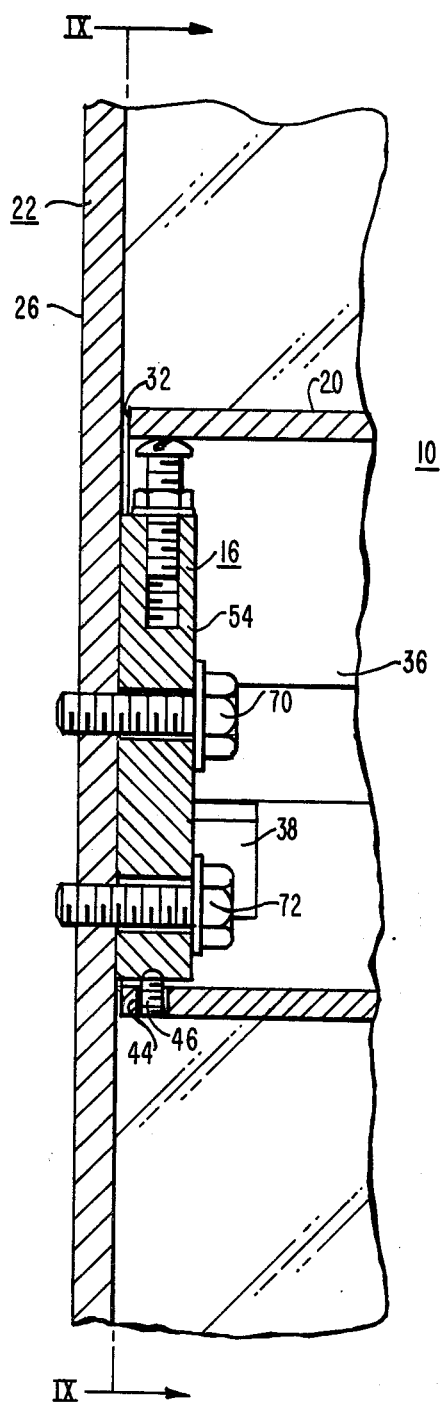
FIG. 3 is an enlarged view, partially in section, of the handrail assembly shown in FIGS. 1 and 2, taken between and in the direction of arrows III—III in FIG. 2.

FIG. 3 is an elevational view, partially in section, of the handrail assembly 10 shown in FIGS. 1 and 2, taken between and in the direction of arrows III—III in FIG. 2. The construction of the handrail assembly 10 is similar adjacent to each of its ends, and thus only its construction adjacent its end 32 will be described in detail.

Figure 4:
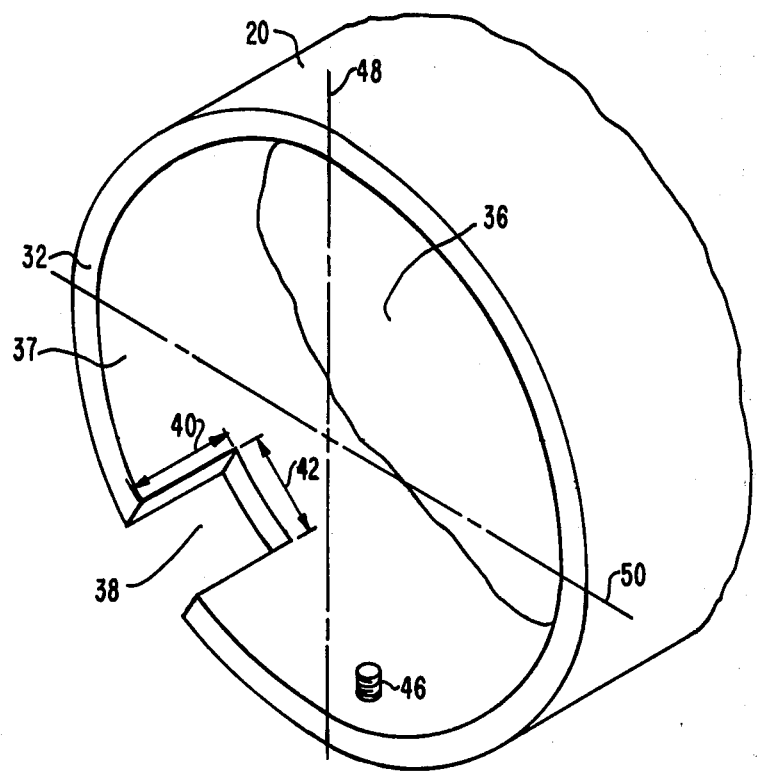
FIG. 4 is a perspective view of one end of a tubular handrail construction having a round cross-sectional configuration, which may be used for the handrail member shown in FIGS. 1, 2 and 3.

Elongated handrail member 20 includes a cavity 36 adjacent to its end 32. As illustrated in FIG. 4, which is a perspective view of handrail member 20, handrail member 20 may be of tubular construction having an outer perriphery which has a round cross-sectional configuration, and an opening 37 which extends between its ends. Thus, the cavity at each end may be part of the continuous opening 37 which extends from end-to-end. A slot or notch 38 is formed in the wall portion of the handrail member 20 which defines the cavity 36, with the slot 38 starting at end 32 and extending inwardly in the longitudinal direction of the handrail member 20 for a predetermined dimension 40. Slot 38 has a predetermined width dimension 42 in a circumferential direction about the periphery of the handrail.

A threaded opening 44 is formed through the wall portion of handrail member 20 which defines cavity 36, with the threaded opening being a predetermined small dimension from end 32. A setscrew 46 is threadably engaged with opening 44 with the setscrew preferably being of the Allen head type, actuatable from the outside of the handrail with an Allen wrench. The position of setscrew 46 has a predetermined angular relationship with the position of the slot 38, measured about the circumference of the handrail member 20. This angle is selected such that when the setscrew 46 is oriented on the vertical axis 48, the slot 38 will appear in the lower lefthand quadrant, when viewing end 32, as shown in FIG. 4, i.e., in the 90° angle formed between the vertical axis 48, and a horizontal axis 50.

Figure 5:
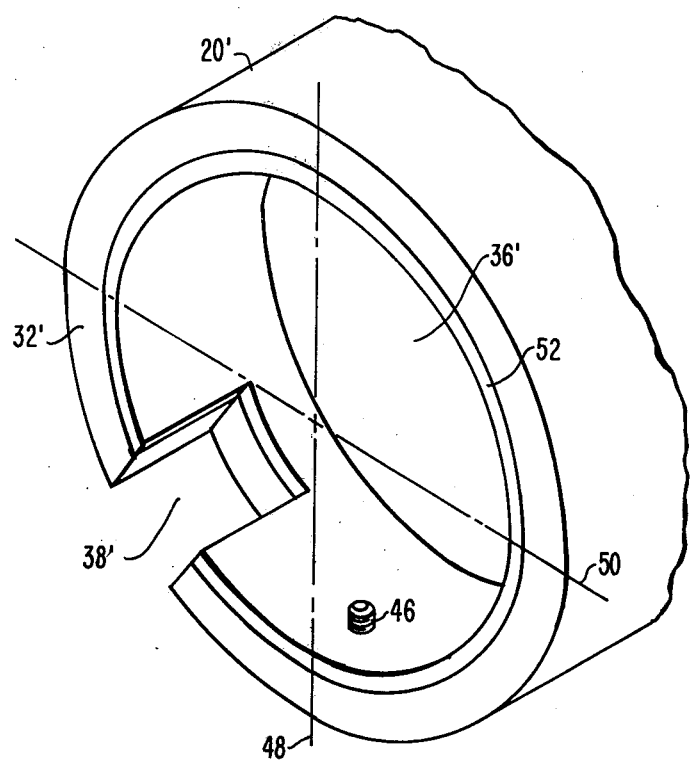
FIG. 5 is a perspective view, similar to that of FIG. 4, except illustrating an embodiment of the invention wherein the handrail assembly is solid, except for cavities as its ends.

While the handrail member 20 is preferably tubular in construction, the invention is equally applicable to a solid handrail. FIG. 5 illustrates a solid handrail 20', such as one formed of wood, for example. When the handrail member is solid, its ends are hollowed out to form cavities, such as cavity 36'. A metallic liner 52 may be inserted into the hollowed end, as illustrated in FIG. 5.

Figure 6:
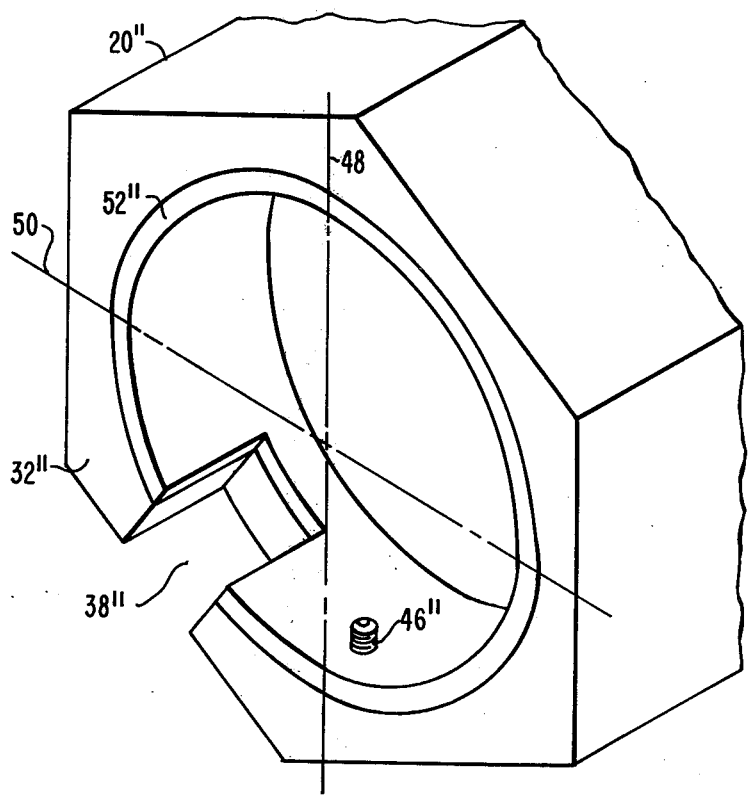
FIG. 6 is a perspective view, similar to that of FIGS. 4 and 5, except illustrating that the outer periphery of the handrail member may be non-round.

In the embodiments of the handrail member shown in FIGS. 4 and 5, the outer configuration of the handrail member is illustrated as being round. FIG. 6 illustrates a handrail member 20" wherein the outer periphery of the handrail has a non-round cross-sectional configuration. Thus, the invention applies to any type of handrail member, tubular or solid, having outer peripheries which are round, or non-round.

Figure 8:
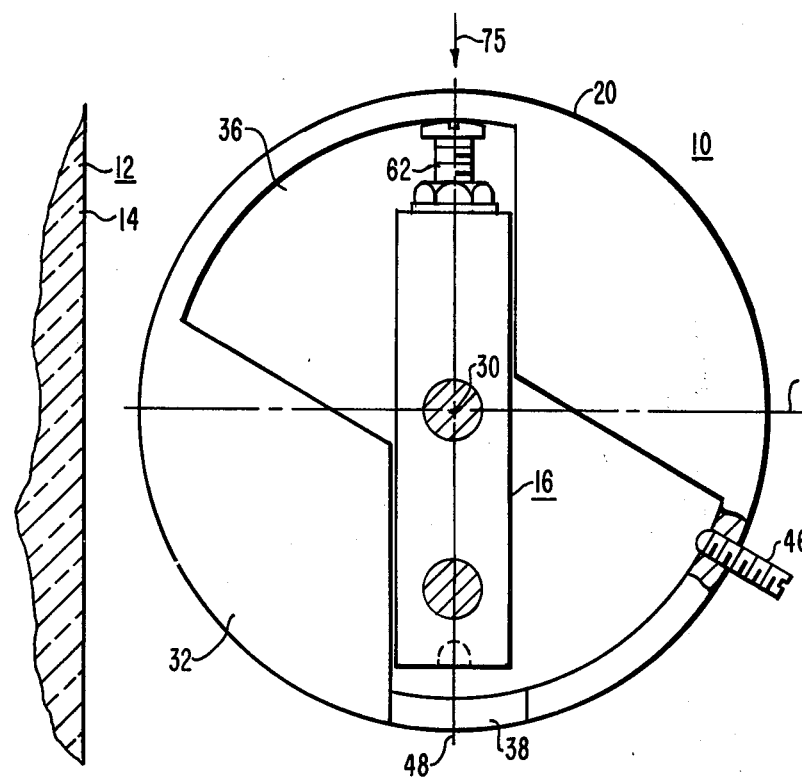
FIG. 8 is an end view of the handrail assembly shown in FIG. 3, taken between and in the direction of arrows IX, illustrating the initial assembly positions of the handrail member and a mounting bracket, and additionally illustrating that the cross-sectional configuration of the cavities for receiving a mounting bracket may be non-round.
Figure 9:
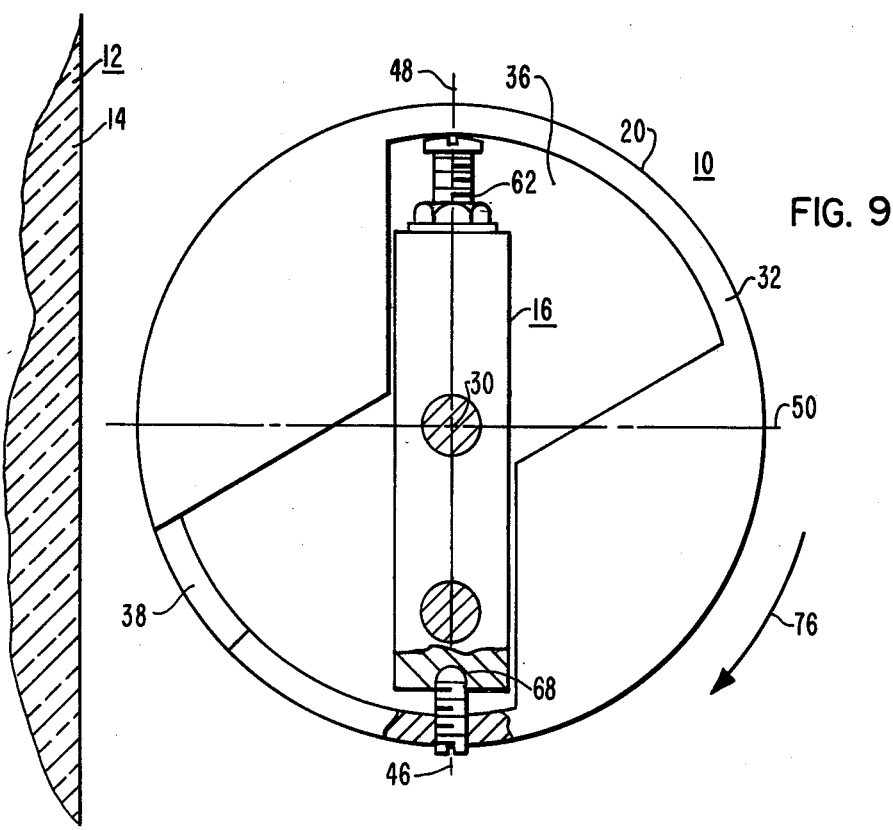
FIG. 9 is a view of the handrail assembly which is similar to that of FIG. 8, illustrating the final lock positions of the handrail member and a mounting bracket.

FIGS. 8 and 9, which will be hereinafter referred to relative to describing the steps of mounting the handrail member 20, also illustrate that the cavity 36 may have a non-round cross-sectional configuration, if desired.

Figure 7:
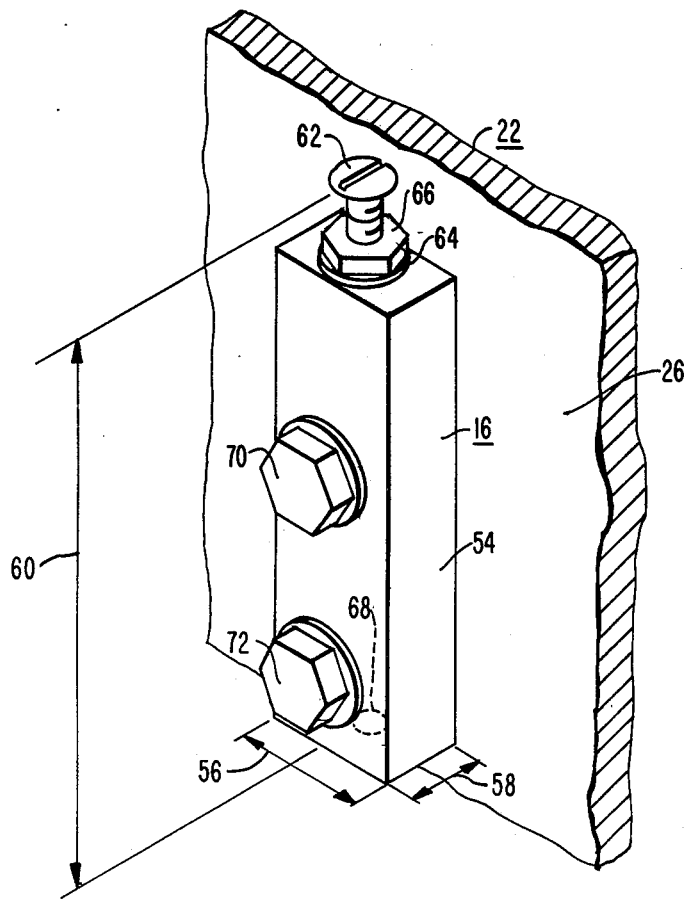
FIG. 7 is a perspective view of the mounting brackets shown in FIG. 3.

Mounting bracket 16 of FIG. 3, which is shown in a perspective view in FIG. 7, includes a main body portion 54, which may be an elongated member having a rectangularly shaped cross-sectional configuration. For example, body portion 54 has width and depth dimensions 56 and 58 selected to enable body portion 54 to enter the slot 38. In other words, the width dimension 56 of body portion 54 must be less than the dimension 42 of slot 38, and the depth dimension 58 of body portion 54 must be less than dimension 40 of slot 38.

When mounting bracket 16 is to accommodate different sizes of handrail members, i.e., handrail members in which the I.D. of the cavity 36 may be different on different handrails, its length dimension 60 may be made adjustable. For example, as illustrated in FIGS. 3 and 7, a threaded opening may be formed in the top portion of body 54, and a pan head screw 62 threadably engaged therewith. A lock washer 64 and lock nut 66 may be used to lock screw 62 in a selected position once the desired dimension 60 is obtained.

A depression 68 is formed in the lower end of body portion 54, which is dimensioned to receive the end of the setscrew 46.

Body portion 54 is fixed to the surface 26 of wall 22 by any suitable fastener means, such as by the Whiz bolts 70 and 72 illustrated, which are suitable when the wall 22 is metallic and provided with threaded openings. If the wall 22 is non-metallic, such as wood, conventional bolt assemblies may be used to secure the mounting bracket to the wall.

In the assembly of the handrail member 20 with its mounting brackets, handrail member 20 is positioned above the mounting brackets 16 and 18 with the slots 38 vertically oriented with the mounting brackets. The handrail member 20 is then lowered such that the mounting brackets 16 and 18 enter the cavities via the slots. The handrail member 20 will be supported on the heads of the adjusting screws 62. This forms a first positional relationship between the mounting brackets and their associated cavities in the ends of the handrail member, with this first positional relationship being shown in FIG. 8. FIG. 8 is a view of the mounting bracket 16 and handrail member 20 shown in FIG. 3, taken between and in the direction of arrows IX. Arrow 75 in FIG. 8 illustrates the movement direction of the handrail member 20 which resulted in the positional relationship illustrated.

Handrail member 20 is then rotated clockwise about its longitudinal axis 30, when viewing the handrail member from its end 32, as illustrated in FIG. 8, to form a second positional relationship between the mounting brackets and their associated cavities. The second positional relationship is illustrated in FIG. 9, which is a view similar to that of FIG. 8, except in FIG. 9 the handrail member has been rotated about its longitudinal axis by a predetermined angular value. The rotational direction of the handrail member 20 which achieved this second positional relationship is indicated by arrow 76 in FIG. 9. Handrail member 20 is rotated in the direction of arrow 76 to move slot 38 into the lower lefthand quadrant, when viewing end 32 as in FIGS. 8 and 9, and to vertically orient the longitudinal axis of setscrew 46, which will automatically align it with the depression 68 formed in the bottom of the body portion 54 of the mounting bracket 16. Setscrew 46 is then advanced into the cavity until it enters and contacts the depression 68, and it is tightened to firmly secure the handrail member 20 between the head of screw 62 and the setscrew 46. The mounting brackets 16 and 18 are thus completely concealed, and the slots 38 and setscrews 46 are concealed from any normal viewing angle.

Maintenance personnel may remove the handrail member 20 quickly and easily, by simply using an Allen wrench.

We claim as our invention:

1. A handrail assembly adapted for mounting between two spaced parallel surfaces, comprising:
    an elongated handrail member having a longitudinal axis which extends between first and second ends, and a predetermined length dimension,
    said handrail member including wall portions, at least at its first and second ends, which define first and second cavities which extend inwardly from said first and second ends, respectively,
    first and second slots in said wall portions which extend inwardly from such first and second ends, respectively, said first and second slots providing access to said first and second cavities, respectively, from a direction transverse to the longitudinal axis of said handrail member,
    first and second spaced members having first and second vertically oriented parallel surfaces, respectively,
    first and second bracket members,
    means mounting said first and second bracket members on said first and second surfaces, respectively,
    the length dimension of said handrail member being selected such that the handrail member will extend between said first and second surfaces with predetermined small clearances between its first and second ends and said first and second surfaces, respectively,
    said first and second bracket members being dimensioned to enable them to enter said first and second cavities, respectively, via said first and second slots, and establish a first positional relationship between said first and second bracket members and said first and second cavities, respectively,
    said first and second cavities and said first and second bracket members being cooperatively dimensioned to permit rotation of said handrail member, after said first and second bracket members have entered said first and second slots, with said rotation establishing a second positional relationship which prevents removal of said handrail member from said bracket member,
    and first and second adjustable fastener means in the wall portions of said handrail,
    said first and second bracket members being configured to cooperate with a predetermined actuated condition of said first and second fastener means, respectively, to maintain said second positional relationship and prevent rotation and removal of said handrail member from said first and second bracket members.

2. The handrail assembly of claim 1 wherein the first and second bracket members have predetermined width and depth dimensions, selected to enable the first and second bracket members to enter the first and second slots, respectively, and including first and second means on the first and second bracket members providing an adjustable height dimension, which height dimension is adjustably selected to accommodate a predetermined dimension of the first and second cavities, respectively.

3. The handrail assembly of claim 1 including a third member having a third vertically oriented surface which extends between the first and second vertically oriented surfaces, with the first and second bracket members being mounted on the first and second surfaces a predetermined dimension from said third vertically oriented surface selected such that the handrail member functions as a handrail for said third vertically oriented surface.

4. The handrail assembly of claim 3 wherein the first and second slots are positioned substantially between the handrail member and the third vertically oriented surface, when the first and second bracket members and the first and second cavities are in the second positional relationship, to conceal the slots when the handrail member is viewed from any normal viewing position.

5. The handrail assembly of claim 3 wherein the first and second fastener means are located below the handrail member, in a vertical plane which intersects the longitudinal axis of the handrail member, when the first and second bracket members and the first and second cavities are in the second positional relationship.

6. The handrail assembly of claim 1 wherein the first and second fastener means include setscrews threadably engaged with openings through the wall portions of the handrail member, and the first and second bracket members include first and second depressions, respectively, which are aligned with the first and second setscrews, respectively, when the first and second bracket members and first and second cavities are in the second positional relationship.

7. The handrail assembly of claim 1 wherein the first and second cavities have a round cross-sectional configuration in a plane perpendicular to the longitudinal axis of the handrail member.

8. The handrail assembly of claim 1 wherein the first and second cavities have a non-round cross-sectional configuration in a plane perpendicular to the longitudinal axis of the handrail member.

9. The handrail assembly of claim 1 wherein the outer periphery of the handrail member has a round cross-sectional configuration.

10. The handrail assembly of claim 1 wherein the outer periphery of the handrail member has a non-round cross-sectional configuration.

* * * * *